(12) United States Patent
Kersey

(10) Patent No.: US 6,414,303 B1
(45) Date of Patent: Jul. 2, 2002

(54) HIGH ACCURACY BRAGG GRATING BASED PRESSURE SENSOR WITH DUAL RESOLUTION MODE

(75) Inventor: Alan D. Kersey, South Glastonbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/487,155

(22) Filed: Jan. 19, 2000

(51) Int. Cl.$^7$ .............................. G01J 1/04; G02B 6/00; G02B 6/34; G01B 11/16; G01L 1/24

(52) U.S. Cl. ...................... 250/227.14; 385/13; 385/37; 356/32; 73/800

(58) Field of Search ...................... 250/227.14, 227.18, 250/227.19, 237 G, 227.12; 385/10, 12, 13, 37; 356/32; 73/800, 862.324

(56) References Cited

U.S. PATENT DOCUMENTS

| | | | | |
|---|---|---|---|---|
| 5,828,059 A | * | 10/1998 | Udd | 250/227.18 |
| 5,848,204 A | * | 12/1998 | Wasner | 385/12 |
| 6,144,026 A | * | 11/2000 | Udd et al. | 250/227.14 |
| 6,278,810 B1 | * | 8/2001 | Sirkis et al. | 385/12 |
| 2001/0005277 A1 | * | 6/2001 | Laming | 356/341 |

* cited by examiner

Primary Examiner—Stephone Allen
Assistant Examiner—Eric J. Spears
(74) Attorney, Agent, or Firm—Ware, Fressola, Van Der Sluys & Adolphson LLP

(57) ABSTRACT

A fiber Bragg grating sensor system has a pi-shifted fiber Bragg grating sensor and a dual resolution mode wavelength detection system. The pi-shifted fiber Bragg grating sensor responds to a parameter, and further responds to an optical source signal, for providing a pi-shifted fiber Bragg grating sensor signal containing information about the parameter. The dual resolution mode wavelength detection system responds to the pi-shifted fiber Bragg grating sensor signal, for providing a dual resolution mode wavelength detection signal containing information about the parameter. The dual resolution mode wavelength detection system includes a low resolution wavelength detection system for detecting a resonance peak in the pi-shifted fiber Bragg grating sensor signal; and includes a high resolution wavelength detection system for detecting a resonance dip in the resonance peak of the pi-shifted fiber Bragg grating sensor signal. The high resolution wavelength detection system includes a scanning laser for detecting the resonance dip in the resonance peak. The dual resolution mode wavelength detection system may also include a high resolution wavelength detection system for detecting a high resolution spectral feature in a resonance peak of the pi-shifted fiber Bragg grating sensor signal.

16 Claims, 5 Drawing Sheets

Basic schematic of a pi-shifted (resonance) wavelength encoded FBG based sensor Low-res detection Figure 1. Basic wavelength encoded FBG based sensor
(Prior Art)

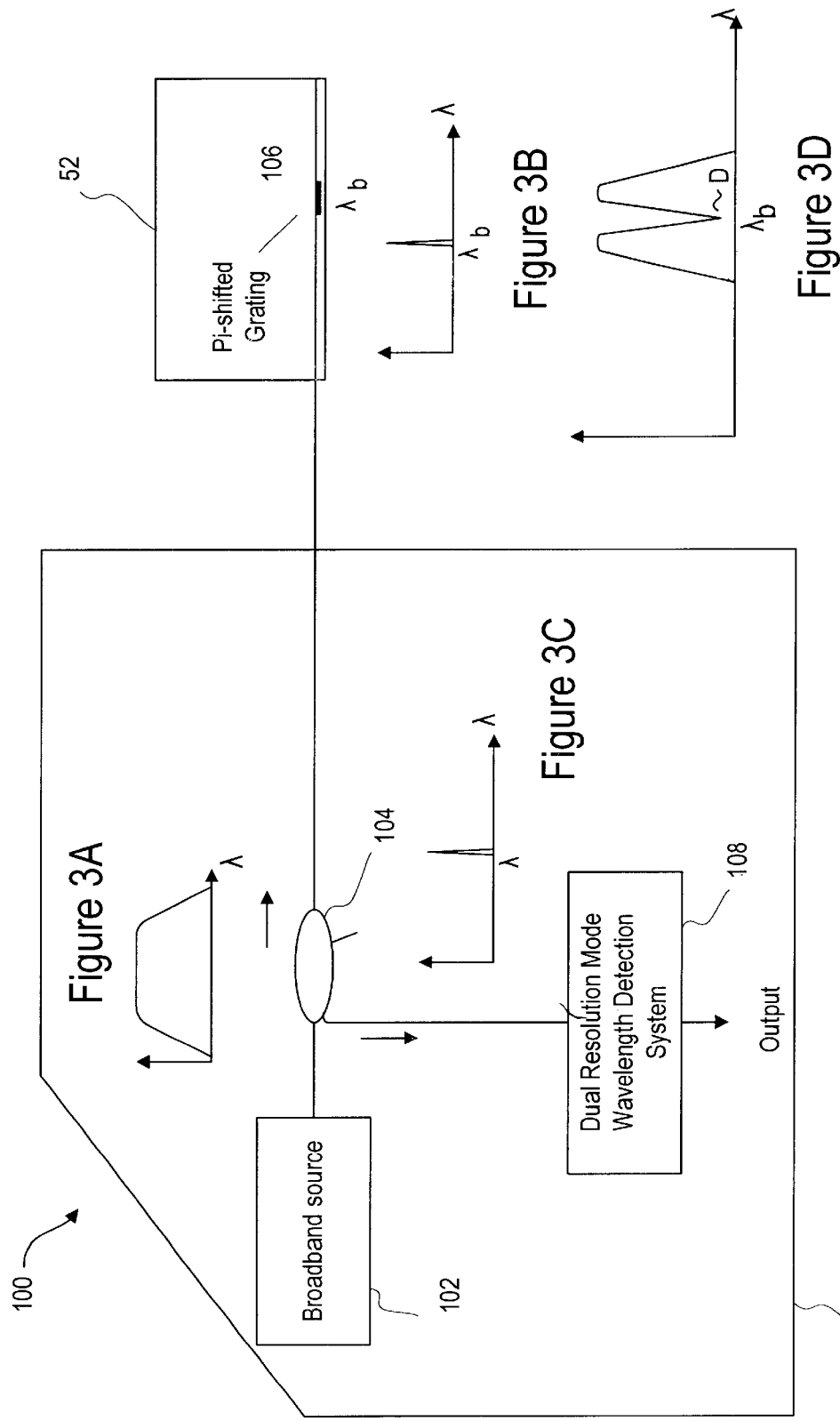
Figure 3. Basic schematic of a pi-shifted (resonance) wavelength encoded FBG based sensor Low-res detection

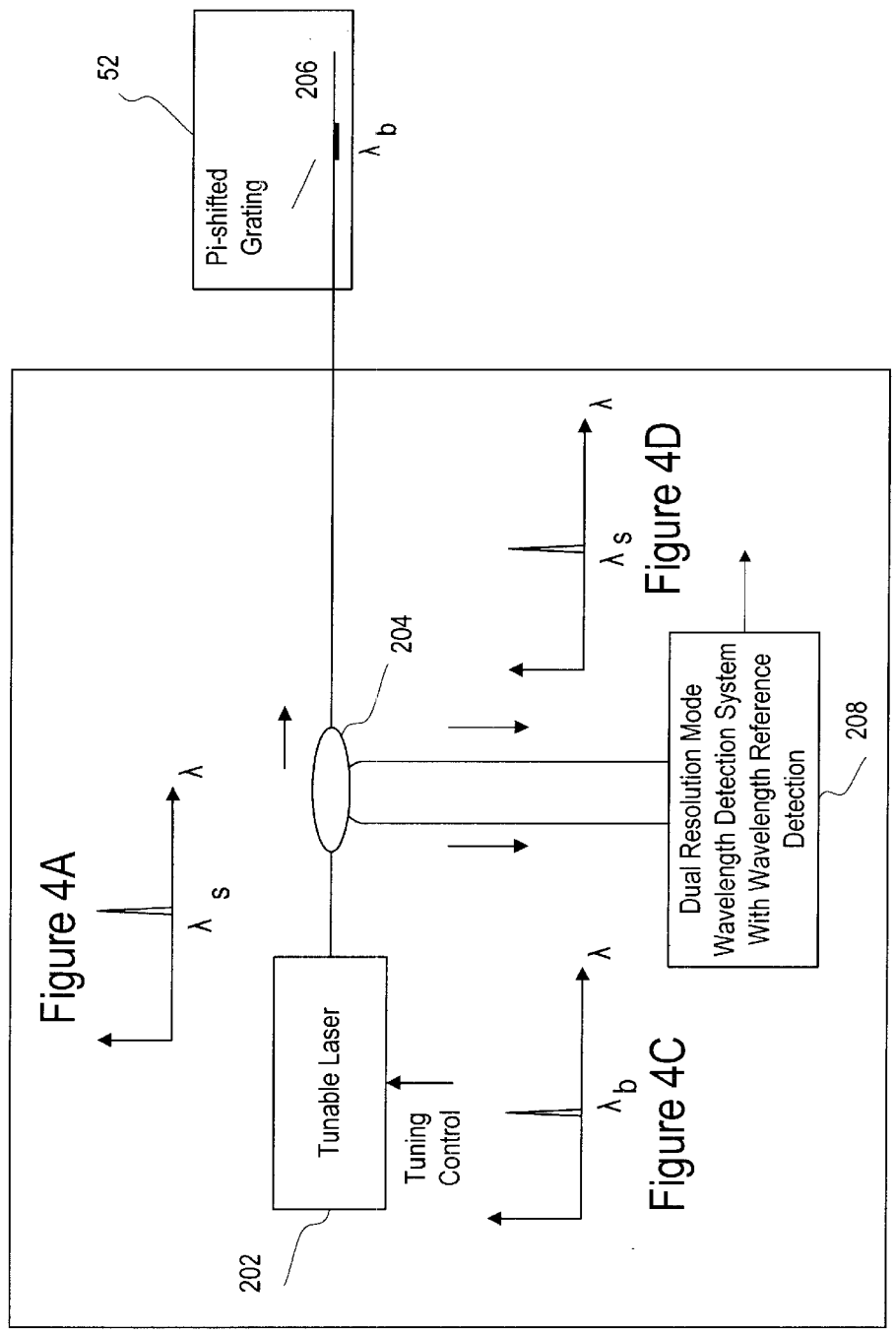
Figure 4. Basic schematic of a pi-shifted (resonance) wavelength encoded FBG based sensor Hi-res detection

HIGH ACCURACY BRAGG GRATING BASED PRESSURE SENSOR WITH DUAL RESOLUTION MODE

BACKGROUND OF INVENTION

1. Technical Field

The present invention relates to a sensor for sensing a parameter such as strain or temperature; and, more particularly, to a fiber Bragg grating sensor system for detecting a resonance dip in a fiber Bragg pi-shifted grating optical signal.

2. Description of Related Art

FIG. 1 illustrates a fiber Bragg grating system known in the art and generally indicated as 10 for the measurement of a wavelength of a fiber Bragg grating. The fiber Bragg grating system 10 includes a broadband source 12, a coupler 14, a fiber Bragg grating 16 and a wavelength detection system 18. The wavelength detection system 18 may be a scanning filter (e.g. Fabry-Perot) based concept, or a scanning interferometer (Michelson, Fourier Transform) based approach. The system output is a measure of a spectral reflectance of the fiber Bragg grating 16, which is typically a single resonance peak as shown in FIGS. 1B, 1C.

It is known in the art to use Bragg grating based transducers for the measurement of pressure using a number of "pressure-to-strain" transduction techniques. Of the approaches developed, a glass-collapsed based compression sensor configuration provides a stable, low hysteresis form of transduction. With this high stability sensor configuration, a limiting factor in determining the accuracy of the overall sensor system appears to be in the ability of the wavelength detection instrumentation system to resolve and track small wavelength shifts of the sensor.

Current techniques used, such as scanning Fabry-Perot and Wavemeter (FFT Spectrometers), have resolution capabilities of about 0.05 to 0.1 um in 1550 nanometer range. For a sensor with a scale factor typical of that developed for grating based devices, this wavelength shift resolution can correspond to a pressure resolution between 0.05 to 0.2 pounds per square inch (psi). In certain applications, particularly pressure transient build-up monitoring, the pressure may need to be monitored with an even higher degree of resolution. In this case, the accuracy of the measurement may not be of utmost importance, but resolution and repeatability are required.

SUMMARY OF INVENTION

In its broadest sense, the present invention provides a fiber Bragg grating sensor system having a pi-shifted fiber Bragg grating sensor in combination with a dual resolution mode wavelength detection system.

The pi-shifted fiber Bragg grating sensor responds to a parameter, and further responds to an optical signal, for providing a pi-shifted fiber Bragg grating sensor signal containing information about the parameter.

The dual resolution mode wavelength detection system responds to the pi-shifted fiber Bragg grating sensor signal, for providing a dual resolution mode wavelength detection signal containing information about the parameter.

The dual resolution mode wavelength detection system includes a low resolution wavelength detection system for detecting the overall centroid resonance peak in the pi-shifted fiber Bragg grating sensor signal; and includes a high resolution wavelength detection system for detecting a resonance dip in the resonance peak of the pi-shifted fiber Bragg grating sensor signal.

The high resolution wavelength detection system includes a scanning laser for detecting the resonance dip in the resonance peak.

The dual resolution mode wavelength detection system may also include a high resolution wavelength detection system for detecting a high resolution spectral feature in a resonance peak of the pi-shifted fiber Bragg grating sensor signal.

The scanning laser repeatably scans a pi-shifted fiber Bragg grating profile, and either identifies a resonance dip center wavelength during each scan, or seeks and locks onto the resonance dip center wavelength.

The dual resolution mode wavelength detection system is switchable for detecting either the resonance peak or the resonance dip.

In one embodiment, the fiber Bragg grating sensor system has a broadband source for providing the optical signal in the form of a broadband optical source signal.

Alternatively, the fiber Bragg grating sensor system has a tunable laser for providing the optical signal in the form of a tunable laser optical signal. In this embodiment, the dual resolution mode wavelength detection system also has a reference detection system that responds to the tunable laser optical source signal.

In effect, a tailored (pi-shifted) grating resonance is used to enhance the detection capability of the fiber Bragg grating sensor. Moreover, the present invention provides a means for facilitating the measurement of a tailored grating sensor element using a dual optical interrogation scheme—one being the "conventional" one used now, and the other a high resolution mode. These interrogation systems interrogate the same sensor, but with differing degrees of accuracy and resolution.

The foregoing and other objects, features and advantages of the present invention will become more apparent in light of the following detailed description of exemplary embodiments thereof, as illustrated in the accompanying drawing.

BRIEF DESCRIPTION OF THE DRAWING

The drawing includes numerous Figures, and the following is a brief description thereof:

FIG. 1A is a graph of a broadband source signal from a broadband source shown in FIG. 1.

FIG. 1B is a graph of a reflected fiber Bragg grating sensor signal from a fiber Bragg grating sensor shown in FIG. 1.

FIG. 1C is a graph of a coupled and reflected fiber Bragg grating sensor signal from a coupler shown in FIG. 1.

FIG. 3 is a diagram of a wavelength encoded fiber Bragg grating sensor system having a pi-shifted grating with low resolution detection that is the subject matter of the to present invention.

FIG. 3A is a graph of a broadband source signal from a broadband source shown in FIG. 3.

FIG. 3B is a graph of a reflected fiber Bragg pi-shifted grating sensor signal from a fiber Bragg grating shown in FIG. 3.

FIG. 3C is a graph of a coupled and reflected fiber Bragg pi-shifted grating sensor signal from a coupler shown in FIG. 3.

FIG. 3D is a graph of an enlarged view of the reflected fiber Bragg grating sensor signal from a fiber Bragg pi-shifted grating shown in FIG. 3B.

FIG. 4 is a diagram of a wavelength encoded fiber Bragg grating sensor system having a Pi-shifted grating with high resolution detection that is the subject matter of the present invention.

FIG. 4A is a graph of a tunable laser signal from a tunable laser shown in FIG. 4.

FIG. 4C is a graph of a coupled and reflected fiber Bragg pi-shifted grating sensor signal from a coupler shown in FIG. 4.

FIG. 4D is a graph of a coupled tunable laser signal from the coupler shown in FIG. 4.

DETAILED DESCRIPTION OF THE INVENTION

Figure 1:
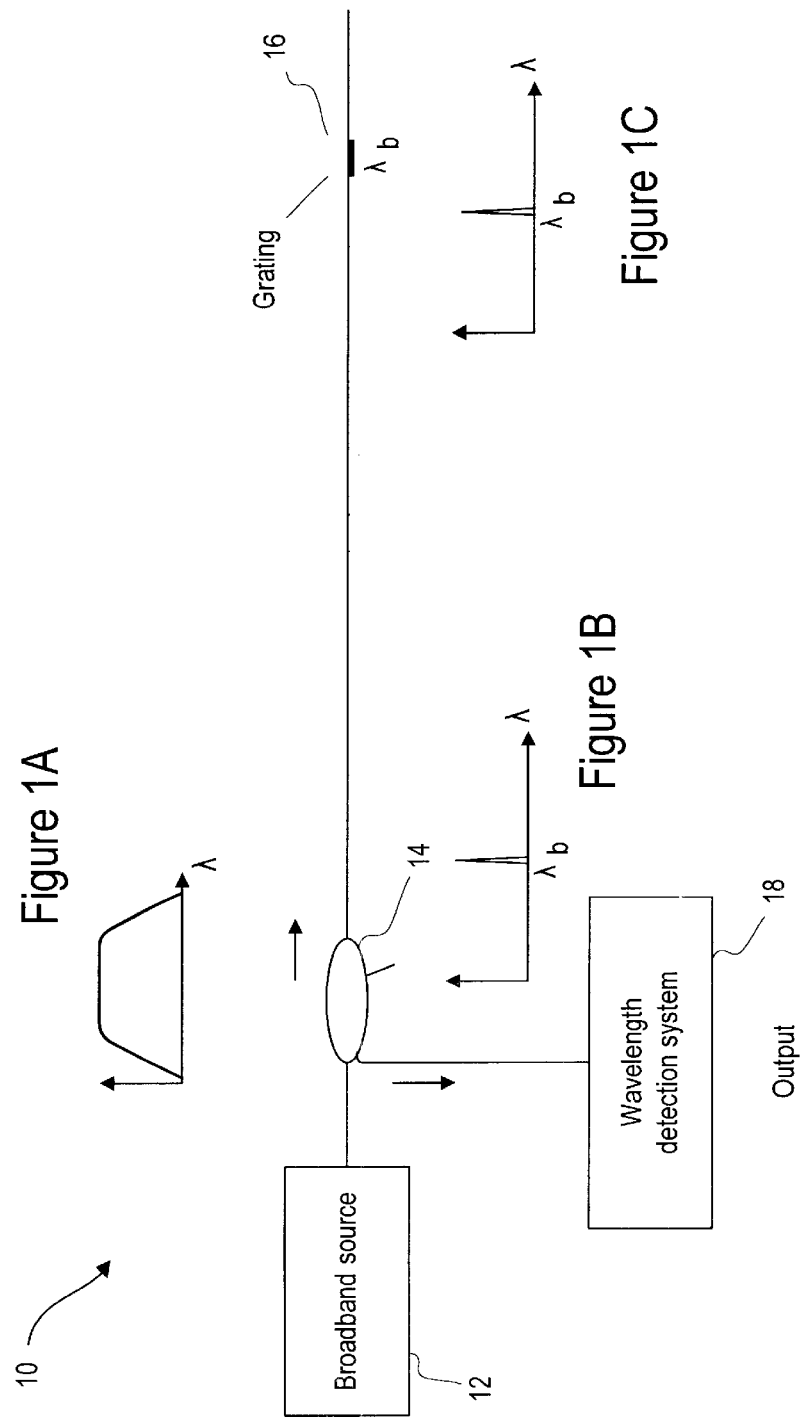
FIG. 1 is a diagram of a wavelength encoded fiber Bragg grating sensor system that is known in the art.
Figure 2:
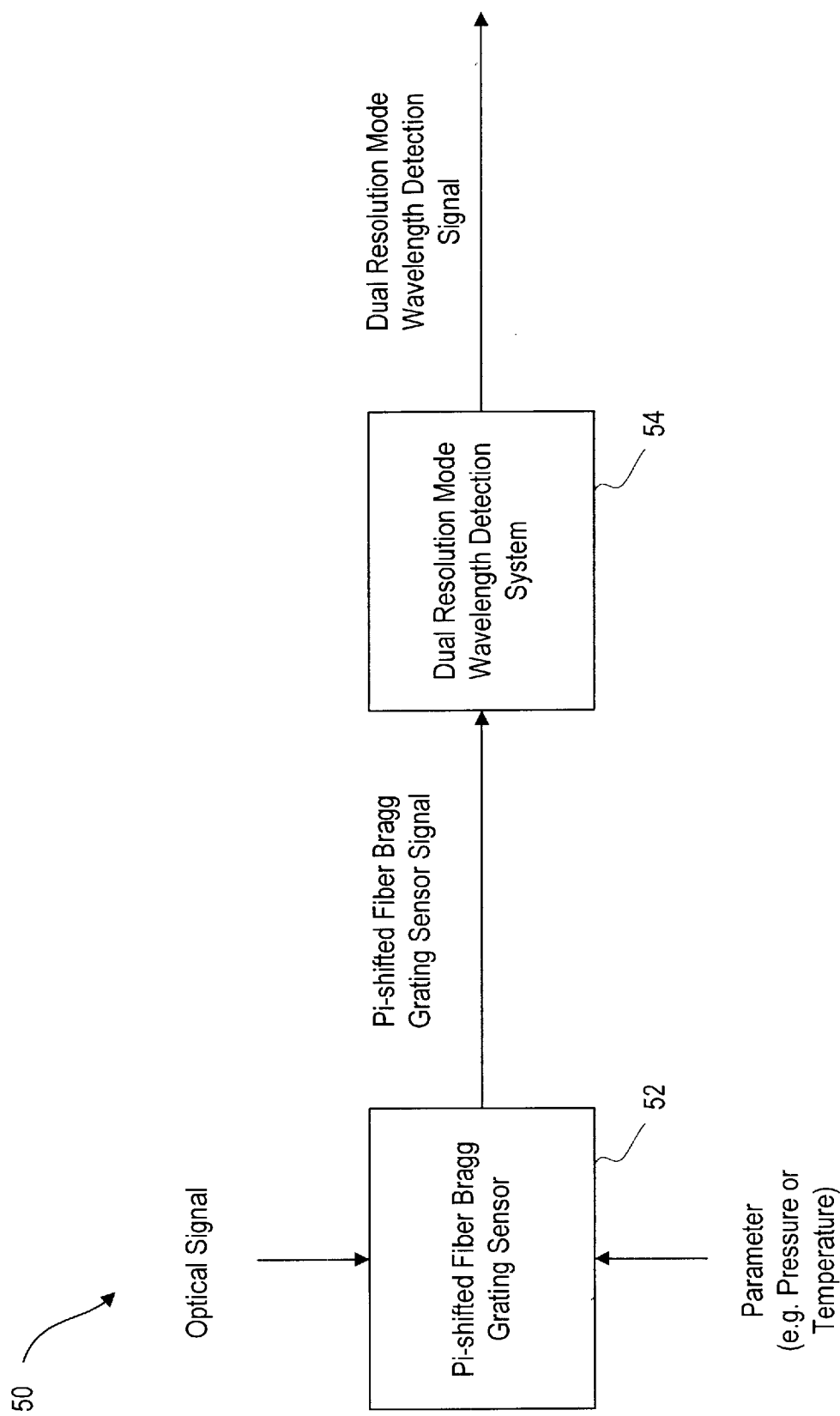
FIG. 2 is a block diagram of a fiber Bragg grating sensor system that is the subject matter of the present invention.

FIG. 2 shows a fiber Bragg grating sensor system generally indicated as 50 having a pi-shifted fiber Bragg grating sensor 52 in combination with a dual resolution mode wavelength detection system 54.

The pi-shifted fiber Bragg grating sensor 52 responds to a parameter, for example, such as pressure or temperature, and further responds to an optical signal, for providing a pi-shifted fiber Bragg grating sensor signal containing information about the parameter. The pi-shifted fiber Bragg grating sensor 52 may include the glass collapsed technology shown and described in patent application Ser. No. 09/455,867), filed Dec. 6, 1999, as well as patent application Ser. No. 09/455,865, filed Dec. 6, 1999, both hereby incorporated by reference in their entirety.

The dual resolution mode wavelength detection system 54 responds to the pi-shifted fiber Bragg grating sensor signal, for providing a dual resolution mode wavelength detection signal containing information about the parameter.

The dual resolution mode wavelength detection system 54 includes a low resolution wavelength detection system for detecting the overall centroid resonance peak in the pi-shifted fiber Bragg grating sensor signal; and includes a high resolution wavelength detection system for detecting a resonance dip in the resonance peak of the pi-shifted fiber Bragg grating sensor signal.

The high resolution wavelength detection system includes a scanning laser for detecting the resonance dip in the resonance peak. Alternatively, the high resolution wavelength detection system may detect a high resolution spectral feature in a resonance peak of the pi-shifted fiber Bragg grating sensor signal.

In light of the description below in relation to FIGS. 3–4, a person skilled in the art would appreciate how to implement the dual resolution mode wavelength detection system 54 having a scanning laser without undue experimentation.

FIG. 3 is a diagram of a wavelength encoded fiber Bragg grating sensor system generally indicated as 100 for performing low resolution detection. In FIG. 3, the fiber Bragg grating sensor system 100 includes a broadband source 102, a coupler 104, a pi-shifted fiber Bragg grating sensor 106 and a dual resolution mode wavelength detection system 108.

The pi-shifted fiber Bragg grating sensor 106 is a grating sensor 106 that is, on a "macroscopic scale", characterized by a single resonance peak (see FIG. 3B). But the single resonance peak contains a narrow resonance dip generally indicated as D (FIGS. 2D and 3E) at a center wavelength (nominally—does not have to be exactly). The pi-shifted fiber Bragg grating sensor 106 is formed by applying a quarter wavelength shift at the center (nominal) of the grating. The resonance can have a bandwidth less than $\frac{1}{100}$ of that of an overall fiber Bragg grating profile; e.g., for a fiber Bragg grating bandwidth of 0.2 nanometers ($10^{-9}$ meters), the resonance dip can have a bandwidth of about 1 picometer ($10^{-12}$ meters) or 125 MHz. (Note: One (1) picometer equals 125 MHz at 1.55 micrometers, and the bandwidth can be expressed either in wavelength or frequency.) In operation, as the pi-shifted fiber Bragg grating sensor 106 is strained, the overall resonance structure shifts across the wavelength range according to the change in the measurand field (e.g. pressure). The "conventional" detection instrumentation system does not have the optical resolution to "see" the sharp resonance dip D, and thus, the wavelength shift is tracked "normally" with the limited resolution in pressure as described above.

However, in the present invention, the dual resolution mode wavelength detection system 108 is switched to an intrinsically high optical resolution, so that the central resonance dip D can be tracked, and a higher wavelength shift resolution attained, thus leading to a higher pressure resolution. In FIG. 3, the dual resolution mode wavelength detection system 108 uses a scanning laser approach. Here, the laser bandwidth needs to be much less than that of the resonance dip D. Lasers with linewidths of about 1–5 MHz would therefore be quite suitable, and are known in the art. The scope of the invention is not intended to be limited to any particular type of scanning laser.

Figure 4B:
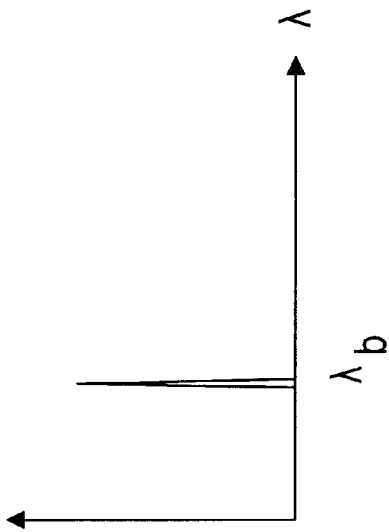
FIG. 4B is a graph of a reflected fiber Bragg pi-shifted grating sensor signal from a fiber Bragg grating shown in FIG. 4.
Figure 4E:
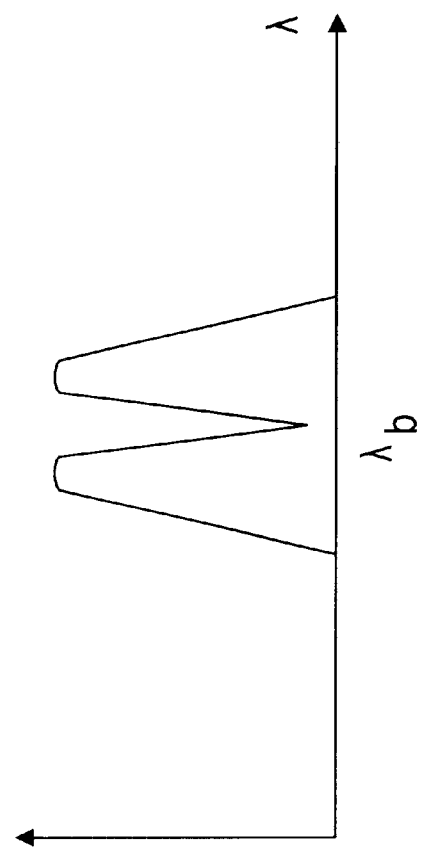
FIG. 4E is a graph of an enlarged view of the reflected fiber Bragg grating sensor signal from a fiber Bragg pi-shifted grating shown in FIG. 4B.

FIG. 4: Reference Wavelength Detection

FIG. 4 is a diagram of a wavelength encoded fiber Bragg grating sensor system generally indicated as 100 for performing high resolution detection. In FIG. 4, the fiber Bragg grating sensor system 200 includes a tunable laser 202, a coupler 204, a pi-shifted fiber Bragg grating sensor 206 and a dual resolution mode wavelength detection system 208 with reference wavelength detection.

In the system 200, the wavelength reference and detection system 208 has a scanning laser. In the "high-resolution" mode, the system 200 would switch to the scanning laser, which repeatably scan the pi-shifted fiber Bragg grating profile, and identify the resonance dip center wavelength during each scan, or 'seek' and 'lock' to the resonance dip and track the pressure induced shifts.

The dual resolution mode wavelength reference and detection system 208 also has a reference system for the scanning laser to ensure good wavelength stability in the high resolution mode.

Advantages

The aforementioned systems in FIGS. 2–4 provide an enhanced resolution of weak pressure signals for down-hole sensors.

In operation, temperature compensation would be required, and can be done via a separate grating pi-shifted element.

The present invention has applications for sensing pressure, temperature, strain, etc.

Any form of high resolution "spectral feature" could be tracked to facilitate this type of sensing, including side notches or a comb structure.

SCOPE OF THE INVENTION

Although the invention has been described and illustrated with respect to exemplary embodiments thereof, the foregoing and various other additions and omissions may be made therein and thereto without departing from the spirit and scope of the present invention.

I claim:

1. A fiber Bragg grating sensor system comprising:

a pi-shifted fiber Bragg grating, responsive to a parameter, and further responsive to an optical signal, for providing a pi-shifted fiber Bragg grating sensor signal containing information about the parameter; and a dual resolution mode wavelength detection system, responsive to the pi-shifted fiber Bragg grating sensor signal, for providing a dual resolution mode wavelength detection signal containing information about the parameter.

2. A fiber Bragg grating sensor system according to claim 1, wherein the dual resolution mode wavelength detection system includes a high resolution wavelength detection system for detecting a resonance dip in a resonance peak of the pi-shifted fiber Bragg grating sensor signal.

3. A fiber Bragg grating sensor system according to claim 2, wherein the high resolution wavelength detection system includes a scanning laser for detecting the resonance dip in the resonance peak.

4. A fiber Bragg grating sensor system according to claim 1, wherein the dual resolution mode wavelength detection system includes a high resolution wavelength detection system for detecting a high resolution spectral feature in a resonance peak of the pi-shifted fiber Bragg grating sensor signal.

5. A fiber Bragg grating sensor system according to claim 1, wherein the dual resolution mode wavelength detection system includes a low resolution wavelength detection system for detecting a resonance peak in the pi-shifted fiber Bragg grating sensor signal; and includes a high resolution wavelength detection system for detecting a resonance dip in the resonance peak of the pi-shifted fiber Bragg grating sensor signal.

6. A fiber Bragg grating sensor system according to claim 3, wherein the scanning laser repeatably scans a pi-shifted fiber Bragg grating profile, and either identifies a resonance dip center wavelength during each scan, or seeks and locks onto the resonance dip center wavelength.

7. A fiber Bragg grating sensor system according to claim 1, wherein the fiber Bragg grating sensor system comprises a broadband source for providing the optical source signal in the form of a broadband optical source signal.

8. A fiber Bragg grating sensor system according to claim 1, wherein the fiber Bragg grating sensor system comprises a tunable laser for providing the optical source signal in the form of a tunable laser optical source signal.

9. A fiber Bragg grating sensor system according to claim 8, wherein the dual resolution mode wavelength detection system includes a reference detection system that responds to the tunable laser optical source signal.

10. A fiber Bragg grating sensor system according to claim 1, wherein the pi-shifted fiber Bragg grating sensor signal has a single resonance peak having a narrow resonance dip.

11. A fiber Bragg grating sensor system according to claim 10, wherein the dual resolution wavelength detection system is switchable for detecting the single resonance peak or the narrow resonance dip.

12. A fiber Bragg grating sensor system according to claim 10, wherein the single resonance peak has a bandwidth of about 0.2 nanometers; and wherein the narrow resonance dip has a bandwidth of about 2 picometers.

13. A fiber Bragg grating sensor system comprising:

an optical source for providing an optical source signal;

a coupler, responsive to the optical source signal, for providing a coupled optical source signal;

a pi-shifted fiber bragg grating, responsive to a parameter, and further responsive to the coupled optical source signal, for providing a pi-shifted fiber Bragg grating sensor signal containing information about the parameter;

the coupler, responsive to the pi-shifted fiber Bragg grating sensor signal, for providing a coupled pi-shifted fiber bragg grating sensor signal; and a scanning laser wavelength detection system, responsive to the coupled pi-shifted fiber bragg grating sensor signal, for providing a scanning laser wavelength detection signal containing information about the parameter.

14. A fiber Bragg grating sensor system according to claim 13, wherein the optical source is a broadband optical source.

15. A fiber Bragg grating sensor system according to claim 13, wherein the optical source is a tunable laser.

16. A fiber Bragg grating sensor system according to claim 13, wherein the scanning laser wavelength detection system has a scanning laser and a reference system to provide high resolution measurements of a pi-shift in the pi-shifted fiber bragg grating sensor signal.

* * * * *

UNITED STATES PATENT AND TRADEMARK OFFICE
CERTIFICATE OF CORRECTION

PATENT NO.    : 6,414,303 B1
DATED         : July 2, 2002
INVENTOR(S)   : Alan D. Kersey It is certified that error appears in the above-identified patent and that said Letters Patent is hereby corrected as shown below:

Column 1,
Line 37, "um" should be -- pm --.

Column 3,
Line 33, ")" should be deleted.
Before line 58, -- Figure 3 -- should be inserted.

Signed and Sealed this

Eighteenth Day of March, 2003

JAMES E. ROGAN
*Director of the United States Patent and Trademark Office*